United States Patent [19]

Onishi et al.

[11] Patent Number: 5,206,688
[45] Date of Patent: Apr. 27, 1993

[54] LIGHT CONTROL DEVICE FOR AN IMAGE FORMING APPARATUS

[75] Inventors: Kunihiro Onishi; Akihiro Takada, both of Osaka; Kaneyuki Sakamoto, Nara, all of Japan

[73] Assignee: Mita Industrial Co., Ltd., Osaka, Japan

[21] Appl. No.: 831,009

[22] Filed: Feb. 5, 1992

Related U.S. Application Data

[63] Continuation of Ser. No. 483,542, Feb. 22, 1990, abandoned.

[30] Foreign Application Priority Data

Feb. 22, 1989 [JP] Japan ................................. 1-42582

[51] Int. Cl.$^5$ ............................................ G03G 15/04
[52] U.S. Cl. ...................................... 355/228; 355/69
[58] Field of Search ........................... 355/228, 229, 69

[56] References Cited

U.S. PATENT DOCUMENTS

| | | | |
|---|---|---|---|
| 4,463,284 | 7/1984 | Tamura et al. | 335/69 X |
| 4,853,739 | 8/1989 | Miyamoto et al. | 355/229 |
| 4,870,454 | 9/1989 | Kurusu et al. | 355/229 X |
| 4,887,122 | 12/1989 | Morikawa | 355/69 X |
| 4,933,607 | 6/1990 | Vogel | 355/69 X |
| 5,095,329 | 3/1992 | Morikawa | 355/69 |

FOREIGN PATENT DOCUMENTS

| | | | |
|---|---|---|---|
| 0238550 | 10/1987 | Japan | 355/229 |
| 0002077 | 1/1989 | Japan | 355/229 |
| 0002078 | 1/1989 | Japan | 355/229 |

Primary Examiner—A. T. Grimley
Assistant Examiner—Nestor R. Ramirez
Attorney, Agent, or Firm—Koda and Androlia

[57] ABSTRACT

An image forming equipment in which a fluorescent lamp is so preheated by controlling the current flowing level for the fluorescent lamp on non-copying after the power source is turned ON such that light energy of the fluorescent lamp becomes an appointed value according to the ON state of the fluorescent lamp on copying when controlling the light energy of the fluorescent lamp in accordance with the signals which come from the light energy detecting means provided at an end part of a fluorescent lamp which is provided in the width direction of the document to read a document image and copy the same by reflecting light to the image surface of the document.

2 Claims, 4 Drawing Sheets

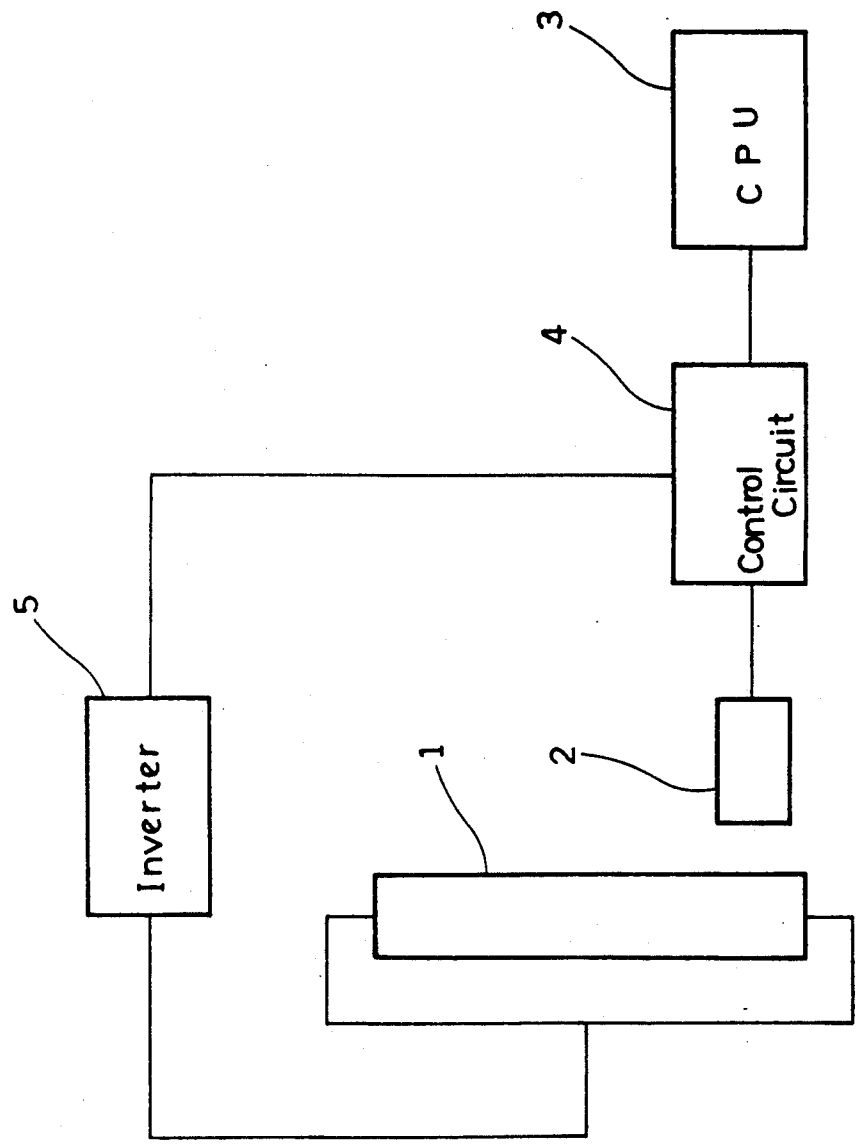

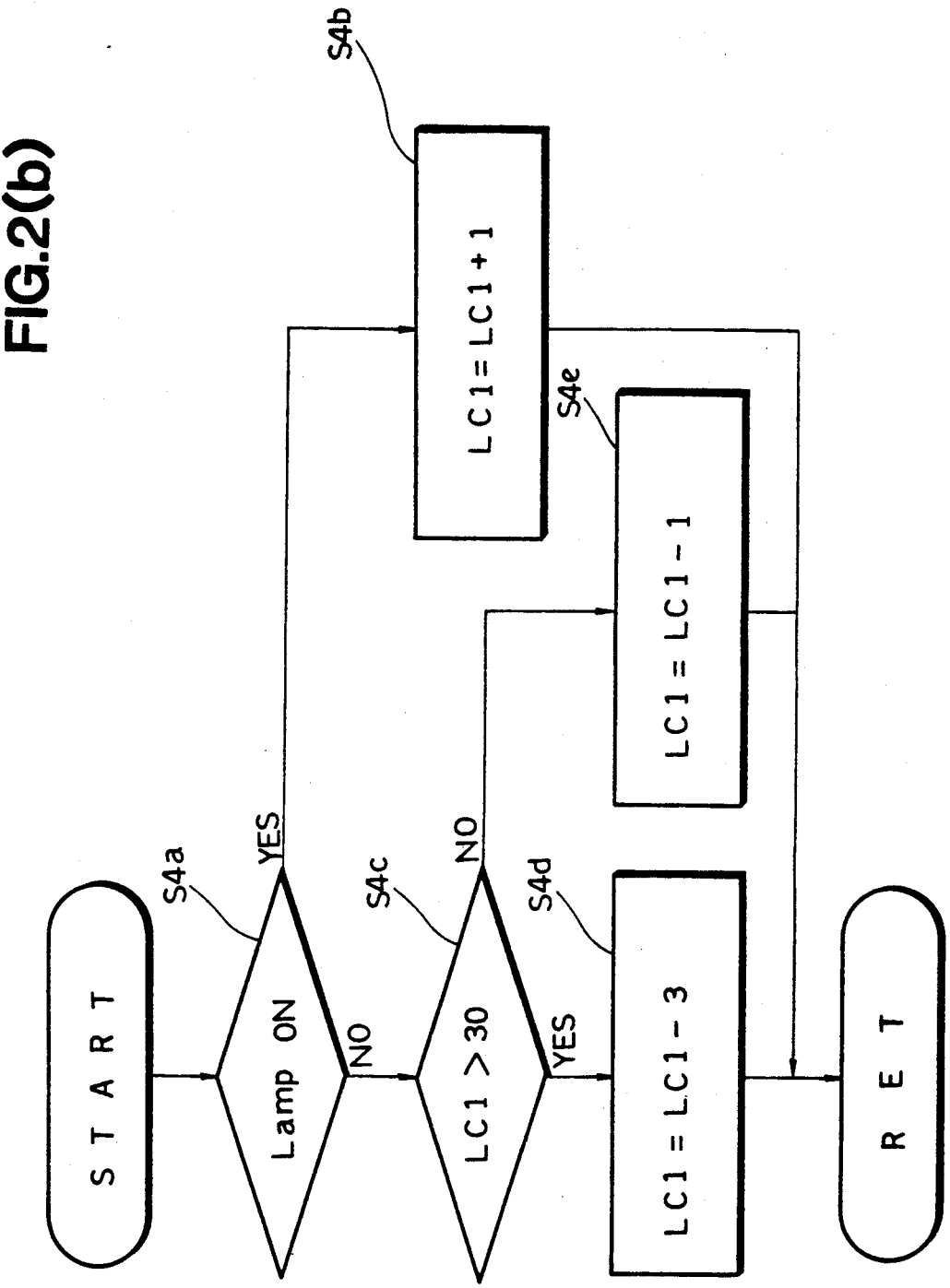

Control routine of the Lamp energy control value

LIGHT CONTROL DEVICE FOR AN IMAGE FORMING APPARATUS

This is a continuation of application Ser. No. 483,542, filed Feb. 22, 1990, now abandoned.

BACKGROUND OF THE INVENTION

1. Field of the Invention

The present invention relates to the image forming equipment of a document copying machine, etc. in which a fluorescent lamp is utilized as the light source, and in particular to image forming equipment which can control the light energy of a fluorescent lamp to the optimal value at all times.

2. Description of the Prior Art

In a document copying machine, for instance, which is one of this kind of image forming equipments, light which is emitted from a fluorescent lamp is reflected to an image surface of a document placed on the document table, and an optical image effected by the reflection light is imaged on a photoconductor. As the surface of the photoconductor is electrified in advance to a fixed potential, an electrostatic latent image which corresponds to the document image is formed, thereby causing this document image to be read. The electrostatic latent image is developed, transferred to a transcribing paper and fixed by a duplicating process which is already known to the public. After that, a required duplicated image can be obtained accordingly.

In this case, the fluorescent lamp is so arranged that the lengthwise direction thereof is placed along with the width direction of the document, and a detector, for instance, a photo diode (light energy detecting means), which can detect the light energy is provided to the end portion of the fluorescent lamp from a point on the space in the vicinity of the fluorescent lamp.

And the light energy of the fluorescent lamp is always measured by the detector and is so controlled through feed-back that the light energy can be kept at a fixed value regardless of temperature change, time variation, etc. of the fluorescent lamp.

An equipment disclosed by the Japanese Laid-Open Pat. Pub. Sho-57-40277 has been known as a document copying machine which is provided with the above functions.

Hereupon, the fluorescent lamp yields a difference in the light energy between the central part and the end portion in the lengthwise direction of the fluorescent lamp on warming up on a low and a high temperature. Namely, the light energy at the end portion of the fluorescent lamp is lower than that at the central portion thereof. For this reason, when the fluorescent lamp is somewhat warmed as result of copying actions, there is almost no difference in respective light energy, thereby causing almost no problem to occur. However, especially in warming up from power OFF to ON of the fluorescent lamp, the light energy may be greatly influenced by the ambient temperature.

And as a detector for detecting the light energy of the fluorescent lamp is provided at the end portion thereof as described above, the light energy of a lower value is accordingly detected on warming up. Furthermore, as the fluorescent lamp is controlled through feed-back according to the lower value, a current which is larger than the necessity is given to the fluorescent lamp. As a result, the central portion of the fluorescent lamp is warmed up earlier than the end portion thereof, thereby causing the light energy at the central portion to be apt to be overshot. Thereafter, the light energy at the end portion if the fluorescent lamp is gradually increased in accompanying with the temperature rise, thereby causing the feed-back current to be decreased, and finally nearly uniform light energy is able to be obtained in the lengthwise direction of the fluorescent lamp.

Thus, it takes a little longer period of time, for instance, about 30 seconds as the stabilization time of the fluorescent lamp after the warming-up thereof. Therefore, if a copying action is carried out in the meantime, such an inconvenience as an overprinted or excessively exposed copying image may occur.

SUMMARY OF THE INVENTION

The invention has been provided to solve the problems in the conventional art.

It is therefore an object of the invention to provide an image forming equipment having such a function that the light energy of a fluorescent lamp can be properly controlled to the optimal level at all times.

Hereupon, this invention can offer a light control device for an image forming apparatus comprising a timer means for calculating an ON time of a fluorescent lamp during a copying state and a preheating state, a subtract means for subtracting a predetermined amount from the ON time of the timer means during a non-copying state, and a lamp preheating means for supplying a lower electric voltage than an electric voltage of ordinary copying process for the fluorescent lamp during a predetermined interval after the timer means becomes zero when the power source of the apparatus turns ON.

According to the image forming equipment disclosed by the invention, for instance, the current flowing level is so controlled that the light energy of the fluorescent lamp can become an appointed value according to the ON state thereof on copying actions and the fluorescent lamp is pre-heat-controlled on non-copying after the power is switched on. As a result, it is possible to control the light energy of the fluorescent lamp to the optimal level at all times without giving a larger current than the necessity to the fluorescent lamp during copying actions.

This specification of the present invention specifically points out the subject thereof and is completed with the claims clearly claimed. The above, and other objects, features and advantages of the present invention, will become apparent from the following description taken in conjunction with the accompanying drawings.

BRIEF DESCRIPTION OF THE DRAWINGS

FIG. 1 is a block diagram of a control system pertaining to a fluorescent lamp of an image forming equipment according to a preferred embodiment of the invention;

FIG. 2(b) is a flow chart showing the control procedure of the fluorescent lamp ON/OFF counter value.

DETAILED DESCRIPTION OF THE PREFERRED EMBODIMENTS

FIG. 1 shows a block diagram of a control system pertaining to a fluorescent lamp of an image forming equipment according to a preferred embodiment of the invention.

In an image forming equipment according to this preferred embodiment, as shown in FIG. 1, light energy detecting means, for example, a photo diode 2, for detecting the light energy of the fluorescent lamp 1 is provided at the end portion of the fluorescent lamp 1 located in the width direction of a document (not illustrated). The photo diode 2 is connected to a control circuit 4 which is controlled by a CPU 3. The fluorescent lamp 1 is controlled through feed-back by the control circuit 4 by way of an inverter 5. In this case, the level of current flowing for the fluorescent lamp 1 is so controlled by the control circuit 4 on non-copying after the power is turned ON such that the light energy of the fluorescent lamp 1 can become an appointed value according to the ON state of the power of the fluorescent lamp 1 during copying, and that the fluorescent lamp 1 can be preheated.

Figure 2A:
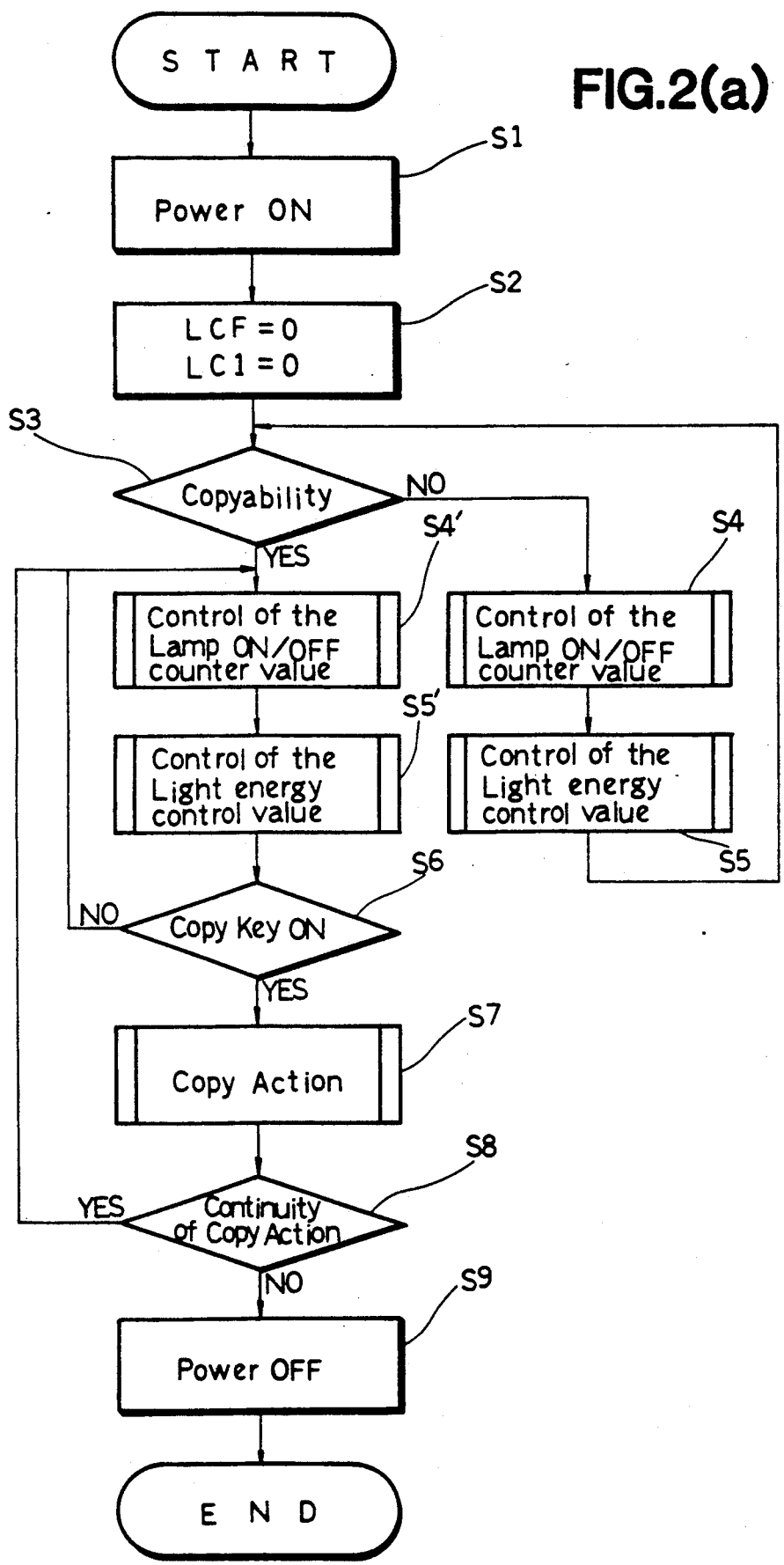
FIG. 2(a) is a flow chart showing the main procedure of control of the above fluorescent lamp.

Subsequently, the ensuing specification describes the detailed procedure of a control example when so controlling the fluorescent lamp 1 as shown in the above, with reference to FIG. 2(a), FIG. 2 (b) and FIG. 2 (c).

In each of the above FIGS., S1, S2, . . . show each step of action.

Firstly, as a main power provided in the equipment body (not illustrated) is switched on (step S1), a lamp control flag LCF and a lamp ON/OFF counter LC1 are reset to zero (0) in the step S2, respectively. The power of the fluorescent lamp 1 is in the OFF state immediately after the main power is turned ON. Afterwards the power of the fluorescent lamp 1 is turned ON when the copying action or the preheating control is started.

As described later, the lamp control flag LCF is for ensuring whether or not it is necessary to execute the preheating control of the fluorescent lamp 1 on non copying after the power is turned ON, according to the length of the ON time of the fluorescent lamp 1 on copying or preheating and when the set value of the lamp control flag LCF is one (1), the preheating control is executed.

The lamp ON/OFF counter LC1, which is utilized for expression of the temperature of the fluorescent lamp 1, counts up by one (1) per second whenever the fluorescent lamp 1 is ON (step S4b). The counter LC1 also counts down by three (3) per second whenever the fluorescent lamp 1 is OFF and the numerical value of the lamp ON/OFF counter LC1 exceeds 30 counts and count down by one (1) per second (step S4e) whenever the fluorescent lamp 1 is OFF and the numerical value of the counter LC1 is less than 30 counts. down by three (3) per second whenever the fluorescent lamp 1 is OFF and the numerical value of the lamp ON/OFF counter LC1 exceeds 30 counts and counts down by one (1) whenever the fluorescent lamp 1 is OFF and the numerical value of the counter LC1 is less than 30 counts.

As the degree of the temperature drop when the fluorescent lamp 1 goes out with the temperature comparatively high after exceeding 30 seconds since turning on the fluorescent lamp 1 is considerably larger than that of the temperature drop when the fluorescent lamp 1 goes out at a comparatively low temperature within 30 seconds since turning on the same. The reason why the numerical value of the subtraction differs in above and below 30 counts as border is to express the degree of the temperature drop.

Therefore, the period of time corresponding to 1 count of the above lamp ON/OFF counter LC1 can properly vary, taking the features of the fluorescent lamp, the ambient temperature, the time variation, etc. into consideration. The period of time of a second corresponds to a count in this embodiment.

Subsequently, in step S3, i is judged whether or not the copying action is possible according to whether or not the fixing temperature becomes a fixable value and is stabilized. Firstly, the preheating control, which is in the impracticable state of the copying action, is described hereinafter. In case that it is judged that the fixing temperature is not stabilized and the copying action is not possible, the value of the lamp ON/OFF counter LC1 is controlled in step S4 (as described later). Consecutively, in the step S5, the light energy control value of the above fluorescent lamp 1 is controlled (as described later). Each of the above controls is continued until it is judged in the step S3 that the copying action is possible.

Figure 2C:
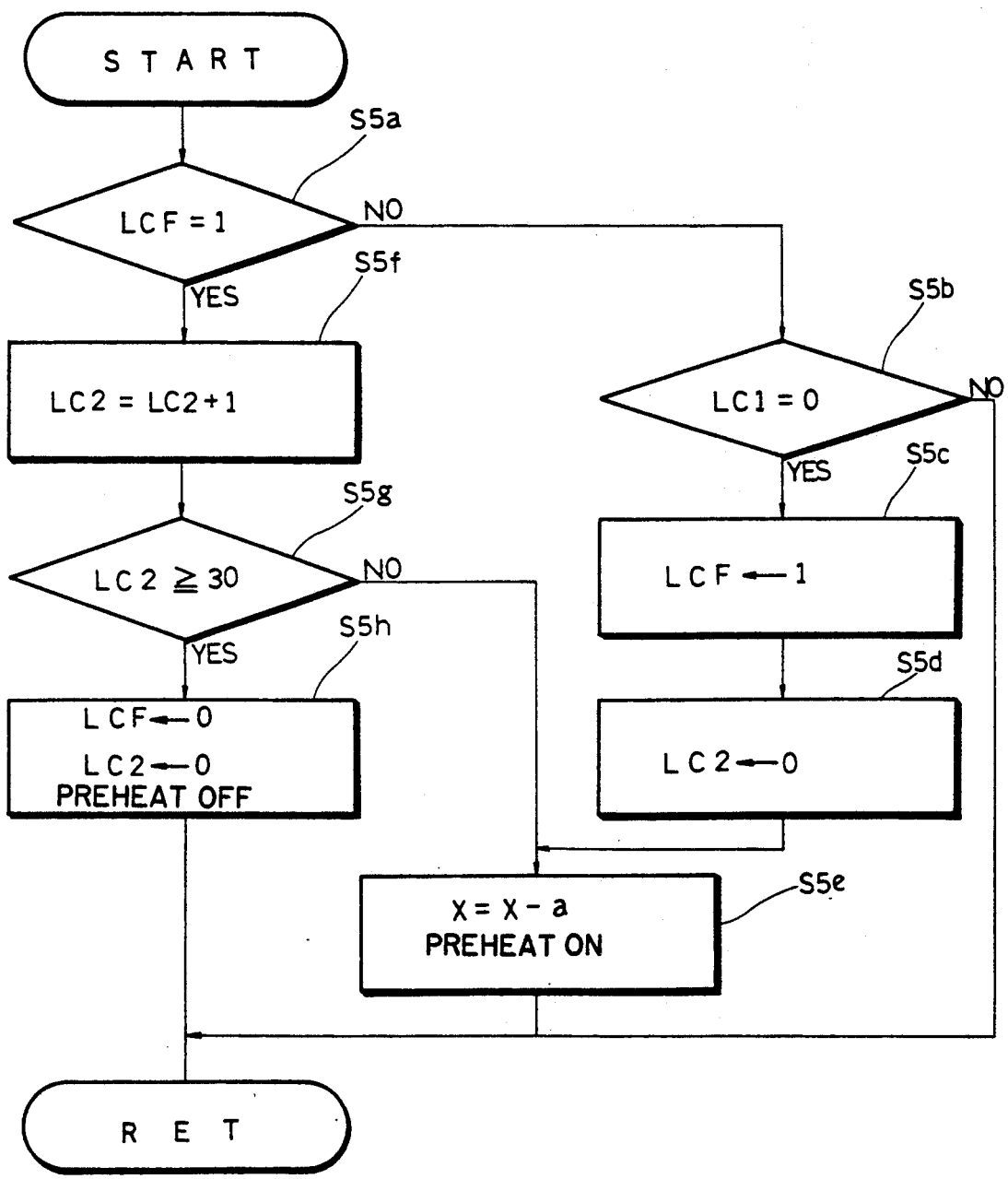
FIG. 2(c) is a flow chart showing the control procedure of the light energy control value of the fluorescent lamp.

In the control (step S4) of the value of the lamp ON/OFF counter LC1, as shown in FIG. 2 (b), it is judged in the step S4a whether or not the fluorescent lamp 1 is in the power ON state. When it is judged in the sep S4a that the fluorescent lamp 1 is in the power ON state, (that is, when the power of the fluorescent lamp 1 is in ON state for the preheating control as described later). In the step S4b, one (1) per second is added to the value of the lamp ON/OFF counter LC1 one after another.

When it is judged in the step S4a that the fluorescent lamp 1 is in the power OFF state, for example, in the case that the fluorescent lamp 1 is not executed the preheating control and is still in the power OFF state immediately after the power is turned ON, it is judged in the step S4c whether or not the value of the lamp ON/OFF counter LC1 is larger than 30.

When it is judged in the step S4c that the value of the lamp ON/OFF counter LC1 is larger than 30, that is, when the period of time for which the power is in ON state is continued for more than 30 seconds at the point of time when the fluorescent lamp 1 is turned OFF, three (3) per second is subtracted from the value of the lamp ON/OFF counter LC1 one after another in the step S4d. And when it is judged in the step S4c that the value of the lamp ON/OFF counter LC1 is less than 30 or when it is judged that the lighting time of the fluorescent lamp 1 is less than 30 seconds since the beginning, one (1) per second is subtracted from the value of the lamp ON/OFF counter LC1 one after another in step S4e.

The power ON and OFF time of the fluorescent lamp 1 is measured (namely, the temperature of the fluorescent lamp 1 is measured.) as shown in the above.

In the control (that is, the preheating control) of the light energy control value of the fluorescent lamp 1, in the next step S5 as shown in FIG. 2 (c), it is judged in the step S5a whether or not the set value of the lamp control flag LCF is one (1). When it is judged in the step S5a that the set value of the lamp control flag LCF is not one (1), for example, when both the value of the lamp control flag LCF and that of the lamp ON/OFF counter LC1 are zero (0) immediately after the power is turned ON in the step 1 and subsequently in the step S2 the lamp control flag LCF and the lamp ON/OFF counter LC1 are reset to zero (0), respectively, it is judged in the step S5b whether or not the set value of the lamp ON/OFF counter LC1 is zero (0).

When it is judged in the step S5b that the set value of the lamp ON/OFF counter LC1 is zero (0), (namely, when the temperature of the fluorescent lamp 1 is sufficiently low) one (1) is inputted in the lamp control flag LCF in the step S5c, and the lamp control counter LC2 is reset to zero (0) in the step S5d.

The lamp control counter LC2 is for measuring the period of time for which the preheating control is effected for the fluorescent lamp 11. In this embodiment, the preheating control is so set that it can be executed consecutively for 30 seconds.

Subsequently, in the step S5e, a light energy control value (X−a) for the fluorescent lamp 1 is outputted, thereby causing the fluorescent lamp 1 to be turned ON and to be preheat-controlled.

In this case, the above-mentioned light energy control value (X−a) is output as a value which is sufficient to moderately preheat the above-mentioned fluorescent lamp 1, although the value is not enough to make copying actions. That is the light energy control value (X−a) is the value that the constant "a" to properly lower the light energy is subtracted from the light energy control value X during the ordinary copying action.

When the state that one (1) is inputted in the lamp control flag LCF in the above step S5c is detected in the step S5a, a value of one (1) per second is added to the lamp control counter LC2 one after another in the step S5f.

The light energy control value (X−a) for the fluorescent lamp 1 is outputted in the step S5e until the value of the lamp control counter LC2 becomes 30 (that is, for 30 seconds) step (S5g), thereby causing the fluorescent lamp 1 to be turned ON and the preheat-control to be continued.

When in the step S5g it is judged that the lamp control counter LC2 becomes 30, both the lamp control flag LCF and the lamp control counter LC2 are reset to zero (0) in the step S5h, and the fluorescent lamp 1 is turned OFF. As a result, the preheat control for the fluorescent lamp 1 ends.

As the fluorescent lamp 1 is turned OFF after the end of the preheating control as mentioned above, "NO" is judged in the step S4a in the FIG. 2(b). At this time, as the value of the lamp ON/OFF counter LC1 equals 30, "NO" is judged in the step S4c. And one (1) is subtracted from the value of the lamp ON/OFF counter LC1 in the step S4e. In this way, one (1) per second is subtracted from the value of the lamp ON/OFF counter LC1 till the fluorescent lamp 1 is turned ON by the preheating control. When the value of the lamp ON/OFF counter LC1 equals 0 in the due time, "YES" is judged in the step S5b. And the preheating control for 30 seconds is resumed in accordance with "the value X=X−a" (step S5e). As mentioned above, the preheating or the outgoing radiation is repeated mutually every 30 seconds during the copying action which can not be executed or till the copying action is started by the operation of the switching-on of the COPY key, and so forth even if the copying action could be executed.

In the period of time from having judged that the copying action is possible in the step S3 till judging that the COPY key has been turned ON in the step S6, the lamp ON/OFF counter value is controlled in the step S4' as well as in the above step S4. And subsequently, the preheating control for the fluorescent lamp 1 is executed in the step S5' as well as in the above step S5.

The above-mentioned description relates to the state in which the copying action (including the scanning action) is not executed yet. The electric voltage corresponding to the light energy control value X is supplied on the power of the fluorescent lamp 1 when the COPY key is turned ON, thereby causing the fluorescent lamp 1 to be heated. The light energy control value X is controlled, thereby causing the detected light energy to be the appointed value as mentioned in the description of the Prior Art.

As the fluorescent lamp 1 is preheated by the preheating control before the COPY key is turned ON in this embodiment, the light energy control value X is not set beyond the demand. Therefore such the inconvenience as the overprinted or excessively exposed copying image in the early period of the copying action does not occur. And in this case, the counted amount (1) per second is added to the value of the lamp ON/OFF counter LC1 whenever the fluorescent lamp 1 is lighted.

When it is judged in the step S6 that the COPY key has been turned ON, the power sources of the fluorescent lamp 1, the motor and the like are promptly turned ON in the step S7, thereby causing the copying action to be started. At this time, the electric voltage corresponding to the light energy control value X in such case that the light energy amount of the fluorescent lamp 1 is the appointed value as mentioned above is supplied on the fluorescent lamp 1. As the fluorescent lamp 1 is carried on lighting whenever the copying action is carried out, the addition of the value (1) to the lamp ON/OFF counter LC1 in the step S4b is continued. At the same time, as the lamp control flag LCF is rest to the value (0) because of the unnecessary of the preheating during the copying action of course, "NO" is judged in the step S5a. Moreover, as the addition to the value of the lamp ON/OFF counter LC1 is kept up then, "NO" is judged in the step S5b. Therefore the preheating control is not executed of course. However, the upper limit value for the value of the lamp ON/OFF counter LC1 is set usually because the temperature of the fluorescent lamp 1 does not stand above a fixed value even if the copying action was kept up for a long time.

"NO" is judged in the step S4a when the copying action comes to an end. And the subtracted degree from the value of the lamp ON/OFF counter LC1 is altered according to the judgment whether the value of the lamp ON/OFF counter LC1 is over the value (30) then or not (step S4d, S4e).

When the lamp ON/OFF counter LC1 reaches the value (0) in consequence of the advance of the computing, the preheating process similar to that described above is started (step S5e). Therefore, as copying action can be started at all times in the state that the fluorescent lamp 1 is always preheated to a certain extent, such inconvenience as the overprinted or excessively exposed copying image as mentioned in the Prior Art does not occur. The power sources of the fluorescent lamp 1, the motor and the like are turned OFF on demand after the copying action is terminated in the step S7. In the case that the copying is not consecutively carried out (step S8), it is judged whether the main power should be turned OFF or not in the step S9. In the case that "OFF" is not judged in the step S9, the power of the fluorescent lamp 1 is turned OFF (step S10). And the processing procedure returns to the judging process of the step S3. On the contrary, the processing is concluded if it is judged that the main power should be turned OFF in the step S9.

In the equipment according to the embodiment, as shown in the above, the current flowing level is so controlled on non-copying after the power is turned ON that the light energy of the fluorescent lamp 1 can be an appointed value according to the ON state of the fluorescent lamp 1 on copying actions and the fluorescent lamp 1 is preheat-controlled on non-copying. Thereby, the light energy of the fluorescent lamp 1 can be controlled to the optimal value on executing the copying actions at all times, without giving any larger current that the necessity to the fluorescent lamp 1.

The invention can be effected and/or carried out in other embodiments without departing from the spirit and substantial features thereof.

Therefore, though the above embodiment is one of the preferred embodiments, the invention is not limited only to the embodiment mentioned in the above.

And it can be easily understood that all the modifications which can be effected in the scope of the claims described hereinafter and the scope meant by the claims are included in the claims hereof.

What tis claimed is:

1. A light control device for an image forming apparatus comprising:
    a timer means for calculating a preheating ON time of a fluorescent lamp during a copying state and a preheating state;
    a subtract means for subtracting a predetermined amount from the ON time of said timer means during a non copying state; and
    a lamp preheating means for supplying a lower electric voltage than an electric voltage of ordinary copying process for the fluorescent lamp during a predetermined interval after the timer means becomes zero when the power source of the apparatus turns ON.

2. A light control device for an image forming apparatus according to claim 1 wherein said timer means and said substrate means comprises a counter which counts up one per second whenever said lamp is ON, counts down three per second whenever said lamp is OFF and a value of said counter is greater than 30 and counts down one per second whenever said lamp is OFF and a value of said counter is less than 30.

* * * * *